(12) United States Patent
Richmond

(10) Patent No.: US 7,187,705 B1
(45) Date of Patent: Mar. 6, 2007

(54) ANALOG SPREAD SPECTRUM SIGNAL GENERATION CIRCUIT

(75) Inventor: Greg Richmond, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 846 days.

(21) Appl. No.: 10/328,904

(22) Filed: Dec. 23, 2002

(51) Int. Cl.
*H04B 1/69* (2006.01)

(52) U.S. Cl. ..................................... 375/130

(58) Field of Classification Search ............... 375/130
See application file for complete search history.

(56) References Cited

U.S. PATENT DOCUMENTS

| | | | |
|---|---|---|---|
| 5,442,664 A | 8/1995 | Rust et al. ................. 375/371 |
| 6,348,827 B1 * | 2/2002 | Fifield et al. .............. 327/278 |
| 6,366,161 B1 * | 4/2002 | Koazechi .................. 327/553 |
| 6,462,623 B1 | 10/2002 | Horan et al. |
| 6,559,698 B1 | 5/2003 | Miyabe |
| 6,643,317 B1 | 11/2003 | Blumer |
| 6,647,052 B2 * | 11/2003 | Hailey ...................... 375/130 |
| 6,703,902 B2 | 3/2004 | Jeon et al. |
| 6,731,667 B1 | 5/2004 | Lee et al. |
| 6,806,767 B2 * | 10/2004 | Dow .......................... 330/51 |
| 6,829,311 B1 * | 12/2004 | Riley ........................ 375/326 |
| 6,919,744 B2 | 7/2005 | Paist et al. |
| 6,982,707 B2 * | 1/2006 | Wang ........................ 345/213 |
| 7,043,202 B2 | 5/2006 | Ozawa et al. |

* cited by examiner

*Primary Examiner*—Temesghen Ghebretinsae
*Assistant Examiner*—Juan Alberto Torres (57) ABSTRACT

An analog spread spectrum signal generation circuit. A clock generator generates a periodic signal. A plurality of switchable analog loading elements each load the periodic signal by a respective load to vary propagation delay of the periodic signal to an output node. A decoder controls the plurality of switchable analog loading elements. A counter coupled to drive the decoder causes the output node to generate a periodic spread spectrum signal with modulated phase. In one embodiment, the periodic spread spectrum signal with modulated phase is used for reducing radiated electromagnetic interference and downstream phase-locked loop tracking error.

20 Claims, 7 Drawing Sheets

ANALOG SPREAD SPECTRUM SIGNAL GENERATION CIRCUIT

FIELD OF INVENTION

The present invention generally relates to the field of electronic circuits. Specifically, embodiments of the present invention relate to an analog spread spectrum signal generation circuit.

BACKGROUND OF THE INVENTION

Typically, when a system is being clocked at a specific frequency, it is desirable that the frequency be very clean (e.g., a straight line in a spectrum). However, putting all the energy for the clock signal at one point in the spectrum introduces electromagnetic interference (EMI) concerns. For instance, it is easy to interfere with other systems or components that are sensitive to a particular frequency because the energy is concentrated in a narrow frequency band.

In order to control EMI between systems and/or components, the Federal Communications Commission (FCC) limits the energy a signal can emit at a point in the spectrum. The FCC measures EMI by using a spectrum analyzer to measure the peak energy at any one point or band in the spectrum. In a spread spectrum, a signal is swept back and forth across the spectrum, dwelling at a particular FCC band for a short period of time, reducing the power measured.

Typically, low frequency modulation is used for spreading the frequency and therefore the energy across several bands. Low frequency modulation is advantageous because it allows for any downstream phase locked loop (PLL) that is referencing the clock signal to track the clock signal where the frequency modulates slow enough to be followed. However, the downstream PLL will build up phase error in attempting to follow the low frequency. Phase error at the input indicates that the PLL must move faster to track the clock signal. When designing a system in which the downstream PLL will follow a spread spectrum clock signal, a delay is built into the system timing budget.

Synchronous systems with downstream PLLs having a bandwidth too low to track the spread spectrum signal will lose synchronization. Frequency modulated clock signals lead to downstream PLL tracking error which, when large enough, may cause system timing failures. Downstream tracking error occurs because the downstream PLL only changes its frequency when there is a phase error at its input. Therefore, to follow or track a signal that is changing frequency, a phase error occurs that is proportional to the frequency slew rate when modulation is within the downstream PLL bandwidth. However, it is ignored when the modulation is outside the PLL bandwidth.

It has been proposed to provide wider frequency modulation in order to spread the energy over more measured frequency bands using digital circuitry. However, digital circuitry for high frequency spread spectrum modulation presents a number of drawbacks. For one, the proposed digital circuitry requires a considerable amount of circuit area. As circuits continue to shrink in size, it is important that components require minimal circuit area. Furthermore, digital circuitry provides limited granularity or resolution, which limits the performance of current frequency spread spectrum modulation techniques.

SUMMARY OF THE INVENTION

Accordingly, a need exists for an analog circuit for providing high frequency spread spectrum modulation. Furthermore, a need exists for an analog circuit that satisfies the above need and requires less circuit area. A need also exists for an analog circuit that satisfies the above needs and provides better granularity with finer resolution.

Various embodiments of the present invention, an analog spread spectrum signal generation circuit, are described herein. In one embodiment, a clock generator generates a periodic signal. In one embodiment, the periodic signal is a high frequency periodic signal. In one embodiment, the clock generator is a voltage controlled oscillator. In one embodiment, the voltage controlled oscillator is locked to a reference frequency by a phase-locked loop.

A plurality of switchable analog loading elements each load the periodic signal by a respective load to vary the propagation delay of the periodic signal to an output node. In one embodiment, the switchable analog loading elements are controlled to provide a non-uniform periodic distribution. In another embodiment, the switchable analog loading elements are controlled to provide a uniform periodic distribution. In one embodiment, the switchable analog loading elements are capacitive load elements. A decoder controls the plurality of switchable analog loading elements. A counter coupled to drive the decoder causes the output node to generate a periodic spread spectrum signal with modulated phase.

In one embodiment, the periodic spread spectrum signal with modulated phase is used for reducing radiated electromagnetic interference and downstream phase-locked loop tracking error.

In another embodiment, the present invention is directed towards a microcontroller comprising an analog spread spectrum signal generation circuit for generating a periodic spread spectrum signal with modulated phase. In one embodiment, the microcontroller also comprises a bus, a processor coupled to the bus, a memory unit coupled to bus, and a plurality of input/output pins coupled to the bus, wherein the analog spread spectrum signal generation circuit is coupled to the bus.

In another embodiment, the present invention provides, in an analog spread spectrum signal generation circuit, a method for generating periodic spread spectrum signal. A high frequency periodic signal is received from a clock generator. The periodic signal is loaded by a load to vary propagation delay of the periodic signal. In one embodiment, the loading is performed by a plurality of switchable analog loading elements, each loading the periodic signal by a respective load to vary the propagation delay of the periodic signal to an output node. In one embodiment, the plurality of switchable analog loading elements are controlled by a decoder.

A periodic spread spectrum signal with modulated phase is generated based on load. In one embodiment, the decoder is driven by a counter, wherein the counter causes the output node to generate the periodic spread spectrum signal with modulated phase for reducing radiated electromagnetic interference and downstream phase-locked loop tracking error.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the various embodiments of the invention, examples of which are illustrated in the accompanying drawings. While the invention will be described in conjunction with the various embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
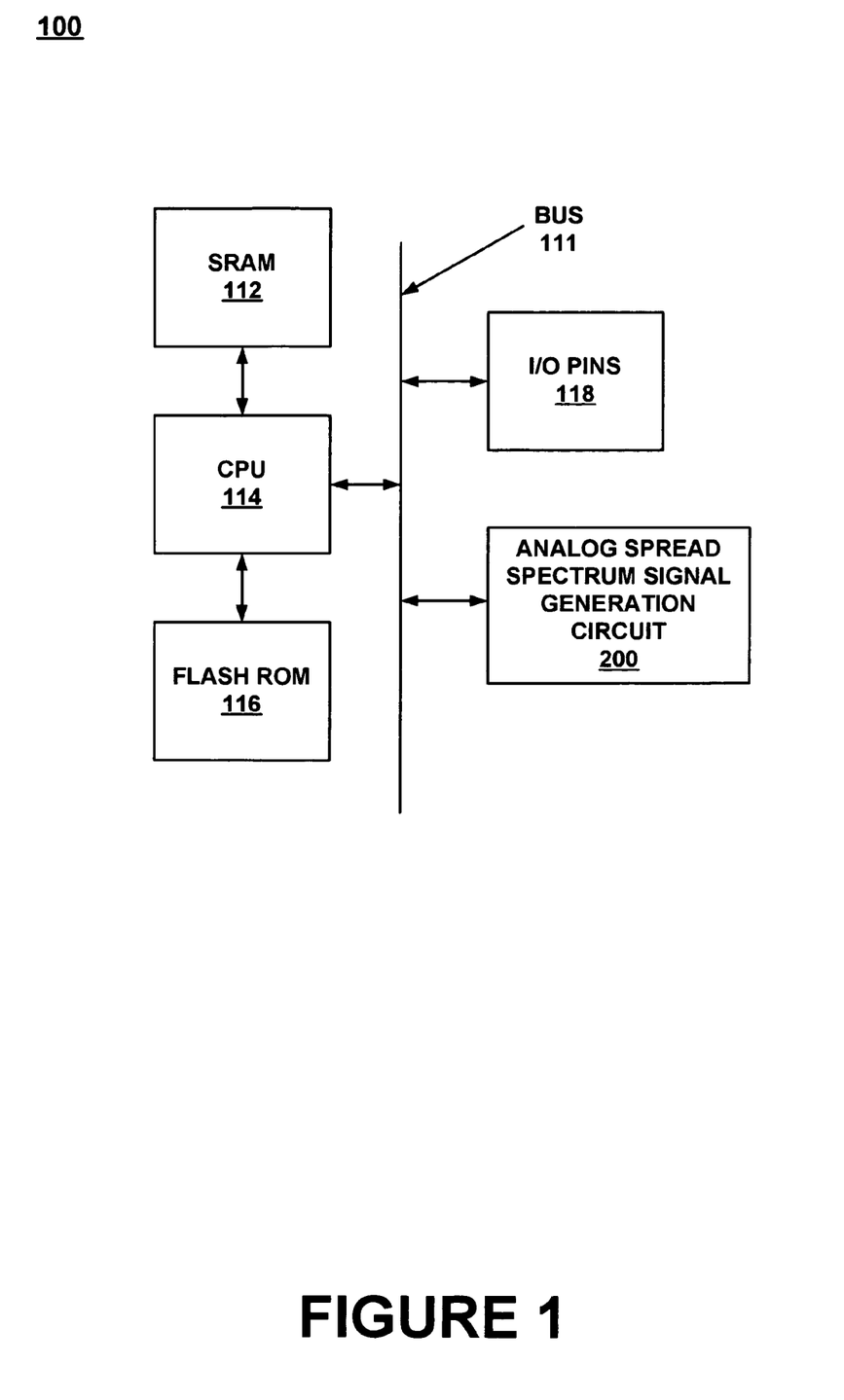
FIG. 1 is a block diagram showing an exemplary digital electronic circuit (or microcontroller) upon which embodiments of the present invention may be implemented.

FIG. 1 is a block diagram showing an exemplary integrated circuit (or microcontroller) 100 upon which embodiments of the present invention may be implemented. Circuit 100 may be implemented on a single die and packaged as a "chip" or integrated circuit (IC) device. In one embodiment, integrated circuit 100 includes a bus 111, and coupled to bus 111 are synchronous random access memory (SRAM) 112 for storing volatile or temporary data during firmware execution, central processing unit (CPU) 114 for processing information and instructions, flash read-only memory (ROM) 116 for holding instructions (e.g., firmware), input/output (I/O) pins 118 providing an interface with external devices and the like, and analog spread spectrum signal generation circuit 200. Analog spread spectrum signal generation circuit 200 is further described below. A test interface (not shown) may be coupled to integrated circuit 100 to perform debugging operations during startup and initialization of the integrated circuit.

In the present embodiment, flash ROM 116 stores parameters describing microcontroller 100, allowing microcontroller 100 to be programmed during production, during system testing, or in the field. It is contemplated that microcontroller 100 may also be self-programmed remotely. SRAM 112 contains programming for CPU 114.

Analog spread spectrum signal generation circuit 200 performs high frequency spread spectrum modulation for synchronizing, pacing and coordinating the operations of a microcontroller. A modulated signal is set to a very high frequency to spread the signal energy over many bands to reduce any individual band's energy for Federal Communications Commission (FCC) measurements. Due to the high modulation frequency, the modulated signal appears as cycle-to-cycle jitter to a downstream phase-locked loop (PLL), thereby reducing downstream PLL tracking error.

Figure 2A:
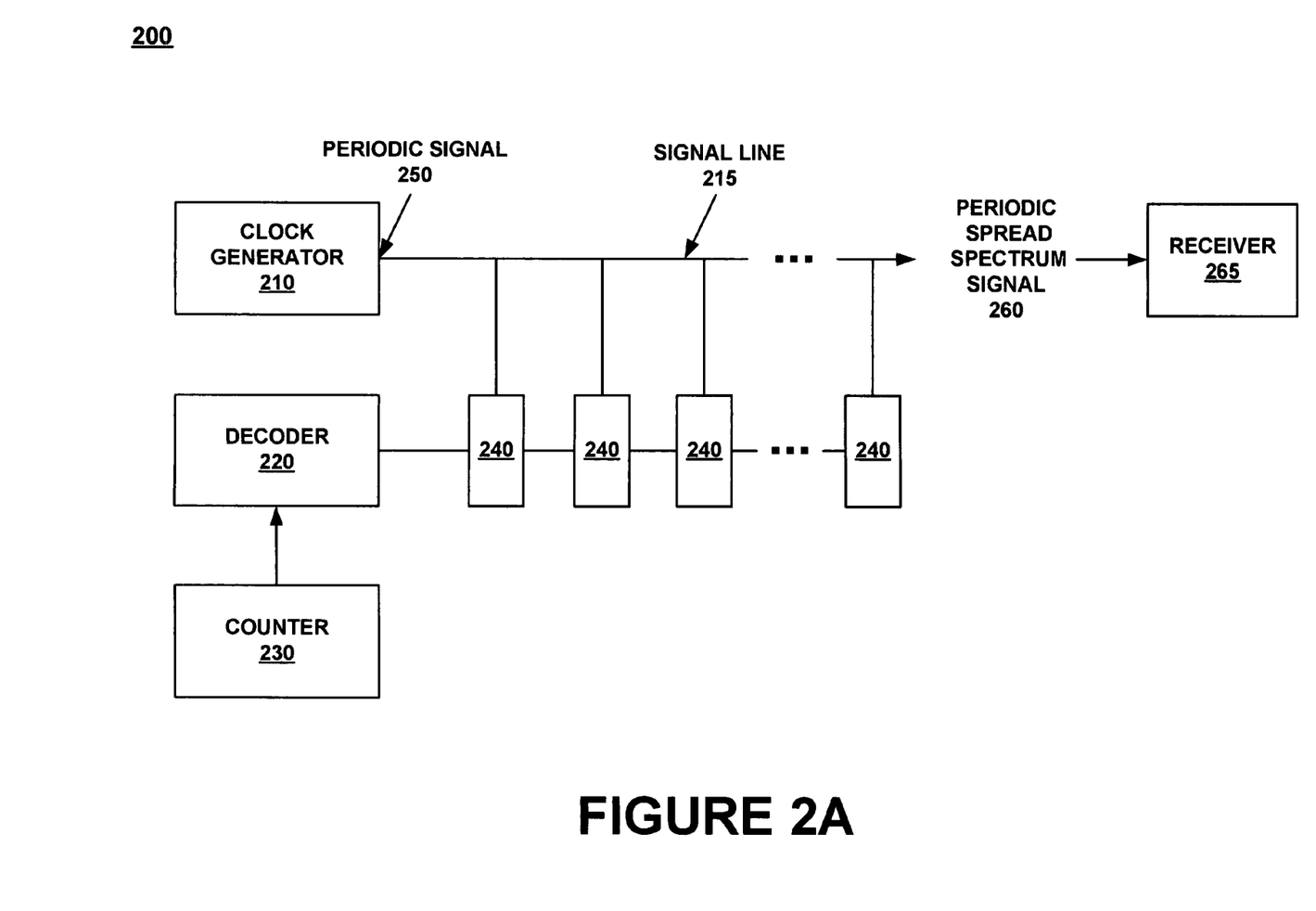
FIG. 2A is a block diagram of an analog spread spectrum signal generation circuit in accordance with one embodiment of the present invention.

FIG. 2A is a block diagram of an analog spread spectrum signal generation circuit 200 in accordance with one embodiment of the present invention. In one embodiment, analog spread spectrum signal generation circuit 200 may be part of a microcontroller (e.g., integrated circuit 100 of FIG. 1).

In one embodiment, circuit 200 comprises clock generator 210, decoder 220, counter 230 and a plurality of switchable analog loading elements 240. Clock generator 210 generates periodic signal 250. In one embodiment, periodic signal 250 is a high frequency periodic signal (e.g., 100 MHz). In one embodiment, periodic signal 250 is the front-side bus frequency of a microcontroller (e.g., microcontroller 100 of FIG. 1).

In one embodiment, clock generator 210 is a voltage controlled oscillator (VCO). In one embodiment, the VCO is locked to a reference frequency by a phase-locked loop. It should be appreciated that clock generator 210 may be any type of clock signal generator or oscillator circuit. For example, in another embodiment, clock generator 210 is a relaxation oscillator circuit. In another embodiment, clock generator 210 is a crystal oscillator circuit.

Periodic signal 250 travels over signal line 215. Signal line 215 is coupled to a plurality of switchable analog loading elements 240. Each switchable analog loading element 240 is operable to load periodic signal 250 by a respective load to vary the propagation delay of periodic signal 250 to an output node. It should be appreciated that the load of each switchable analog loading element 240 is selectable, and can be adjusted according to system requirements. For example, the steps between frequencies, the difference in periods from one cycle to the next, and the number of cycles in a spreading pattern can be changed. In one embodiment, switchable analog loading elements 240 are capacitive load elements. In one embodiment, each switchable analog loading element 240 has a capacitance on the order of one to ten femtofarads.

By loading periodic signal 250 with respective loads, switchable analog loading elements 240 operate to delay periodic signal 250. Each switchable analog loading element 240 delays periodic signal 250 on the order of a few picoseconds. Delaying periodic signal 250 causes abrupt changes in the phase in which the period is transmitted.

Figure 2B:
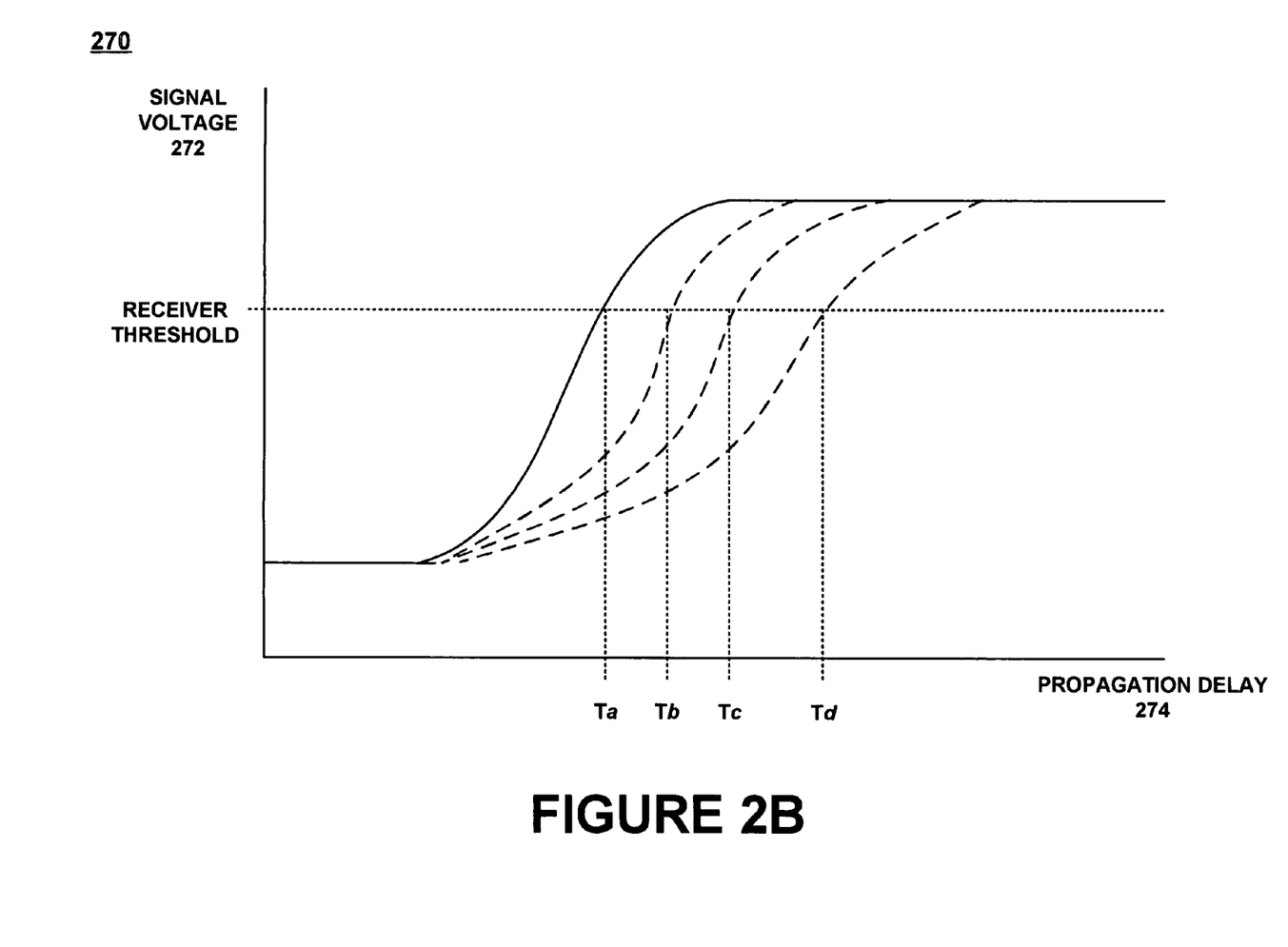
FIG. 2B is a graphical diagram of signal voltage versus propagation delay for a plurality of switchable analog loading elements in accordance with one embodiment of the present invention.

FIG. 2B is a graphical diagram 270 of signal voltage 272 versus propagation delay 274 for a plurality of analog loading elements (e.g., switchable analog loading elements 240 of FIG. 2A) in accordance with one embodiment of the present invention. Analog loading elements change the propagation delay for each cycle, thereby changing the period of each cycle when the load changes during the cycle. Since frequency is inversely proportional to period, the frequency for each cycle is different. For example, the frequency of cycle a is the inverse of the period for cycle a (e.g., $F_a = 1/T_a$).

With reference to FIG. 2A, circuit 200 further comprises decoder 220 for controlling switchable analog loading elements 240. Counter 230 is coupled to decoder 220 and drives decoder 220. In one embodiment, decoder 220 enables one switchable analog loading element 240 for each VCO clock cycle. In one embodiment, switchable analog loading elements 240 are controlled to provide a non-uniform periodic distribution. In another embodiment, switchable analog loading elements 240 are controlled to provide a uniform periodic distribution.

Delaying periodic signal 250 according to the load of switchable analog loading elements 240 results in the generation of periodic spread spectrum signal 260. Periodic spread spectrum signal 260 has a modulated phase (e.g., edge) which travels through a plurality of discrete phases. In one embodiment, periodic spread spectrum signal 260 with modulated phase is used for reducing radiated electromagnetic interference (EMI) and downstream phase-locked loop (PLL) tracking error at receiver 265.

Figure 3A:
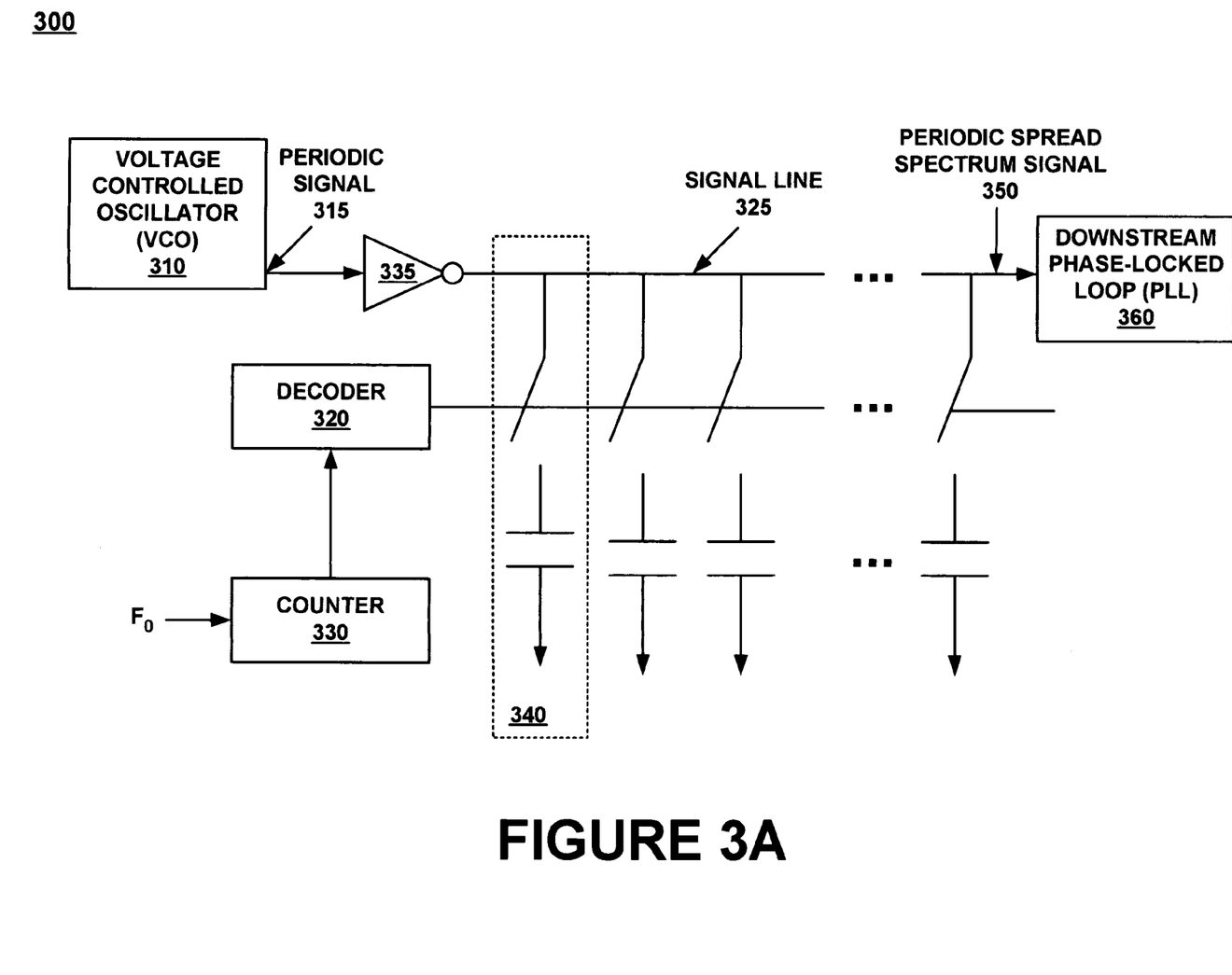
FIG. 3A is a circuit diagram of an analog spread spectrum signal generation circuit in accordance with one embodiment of the present invention.

FIG. 3A is a circuit diagram of analog spread spectrum signal generation circuit 300 in accordance with one embodiment of the present invention. In one embodiment, analog spread spectrum signal generation circuit 300 may be part of a microcontroller (e.g., analog spread spectrum signal generation circuit 200 of integrated circuit 100 of FIG. 1).

In one embodiment, circuit 300 comprises VCO 310. In one embodiment, VCO 310 is locked to a reference frequency by a phase-locked loop. VCO 310 generates periodic signal 315. In one embodiment, periodic signal 315 is a high frequency periodic signal (e.g., 100 MHz). In one embodiment, periodic signal 315 is the front-side bus frequency of a microcontroller (e.g., microcontroller 100 of FIG. 1).

Periodic signal 315 travels through inverter 335 (e.g., a signal buffer) and is output over signal line 325. Signal line 325 is coupled to a plurality of switchable analog capacitive loading elements 340. Each switchable analog capacitive loading element 340 is operable to load periodic signal 315 by a respective load to vary propagation delay of periodic signal 315 to an output node. It should be appreciated that the load of each switchable analog capacitive loading element 340 is selectable, and can be adjusted according to system requirements. In one embodiment, each switchable analog loading element 340 has a capacitance on the order of one to ten femtofarads.

By loading periodic signal 315 with respective loads, switchable analog capacitive loading elements 340 operate to delay periodic signal 315. Each switchable analog capacitive loading element 340 delays periodic signal 315 on the order of a few picoseconds.

Circuit 300 further comprises decoder 320 for controlling switchable analog capacitive loading elements 340. Counter 330 is coupled to decoder 320. In one embodiment, decoder 320 enables one switchable analog capacitive loading element 340 for each VCO clock cycle. In one embodiment, switchable analog capacitive loading elements 340 are controlled to provide a non-uniform periodic distribution. In another embodiment, switchable analog capacitive loading elements 340 are controlled to provide a uniform Periodic distribution.

In another embodiment, the load of periodic signal 315 can be kept constant, and the drive strength of the signal buffer (e.g., inverter 335) can be modulated by decoder 320.

Delaying periodic signal 315 according to the load of switchable analog capacitive loading elements 340 results in the generation of periodic spread spectrum signal 350. Periodic spread spectrum signal 350 has a modulated phase (e.g., edge) and frequency which travels through a plurality of discrete phases and frequencies. In one embodiment, periodic spread spectrum signal 350 with modulated frequency is received at downstream PLL 360. Periodic spread spectrum signal 350 with modulated frequency is used for reducing radiated electromagnetic interference (EMI) and downstream phase-locked loop (PLL) tracking error.

Figure 3B:
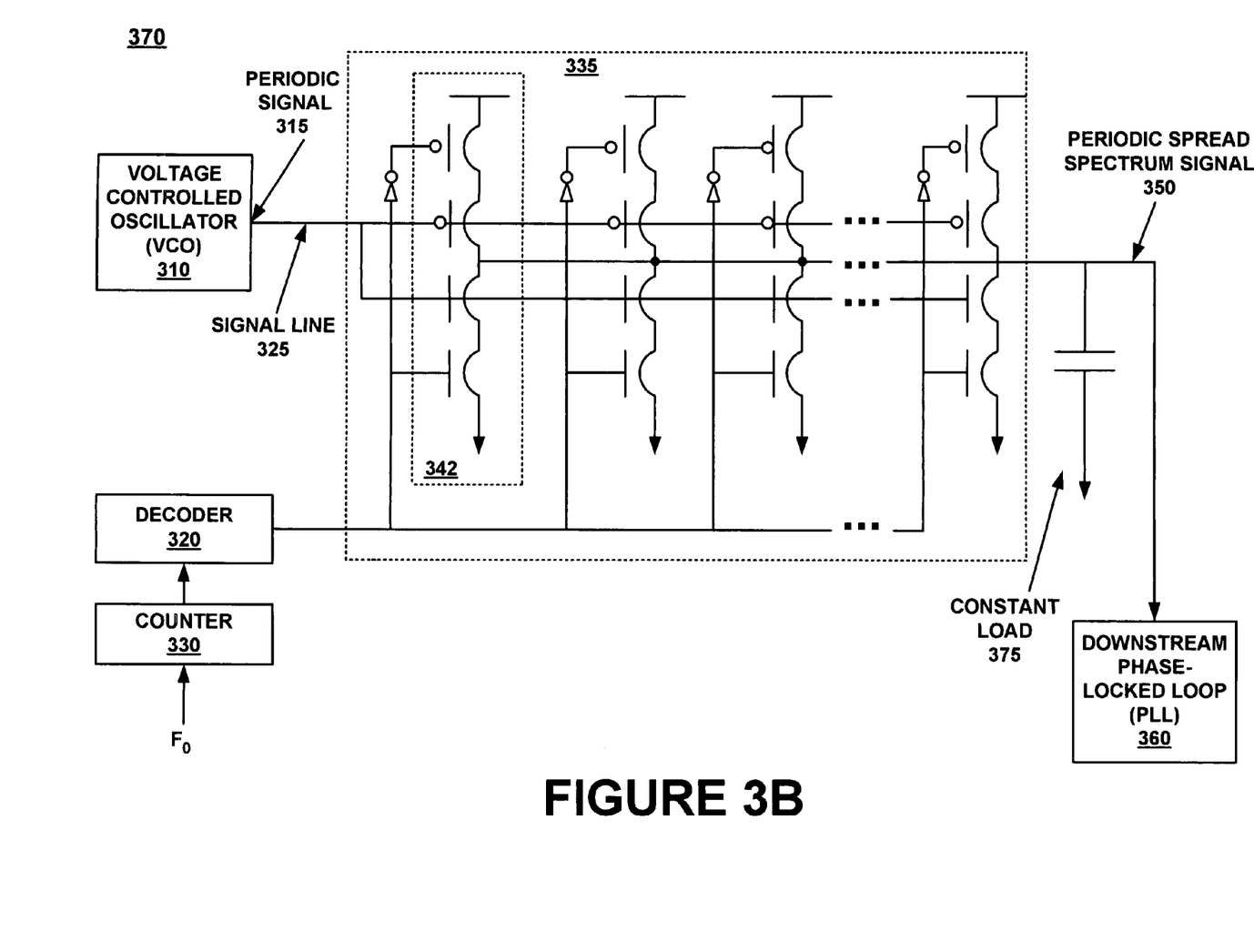
FIG. 3B is a circuit diagram of an analog spread spectrum signal generation circuit in accordance with another embodiment of the present invention.

FIG. 3B is a circuit diagram of an analog spread spectrum signal generation circuit 370 in accordance with another embodiment of the present invention. Circuit 370 operates in a similar manner as circuit 300 of FIG. 3A. However, in contrast to circuit 300, the load of periodic signal 315 is kept constant according to constant load 375. The drive strength of signal buffer 335 (e.g., inverter 335) is modulated by decoder 320. In one embodiment, decoder 320 modulates a plurality of switchable analog drive elements 342, wherein each switchable analog drive element 342 reduces the output impedance of signal buffer 335 to vary propagation delay of periodic spread spectrum signal 350 to an output node (e.g., downstream PLL 360).

Figure 4:
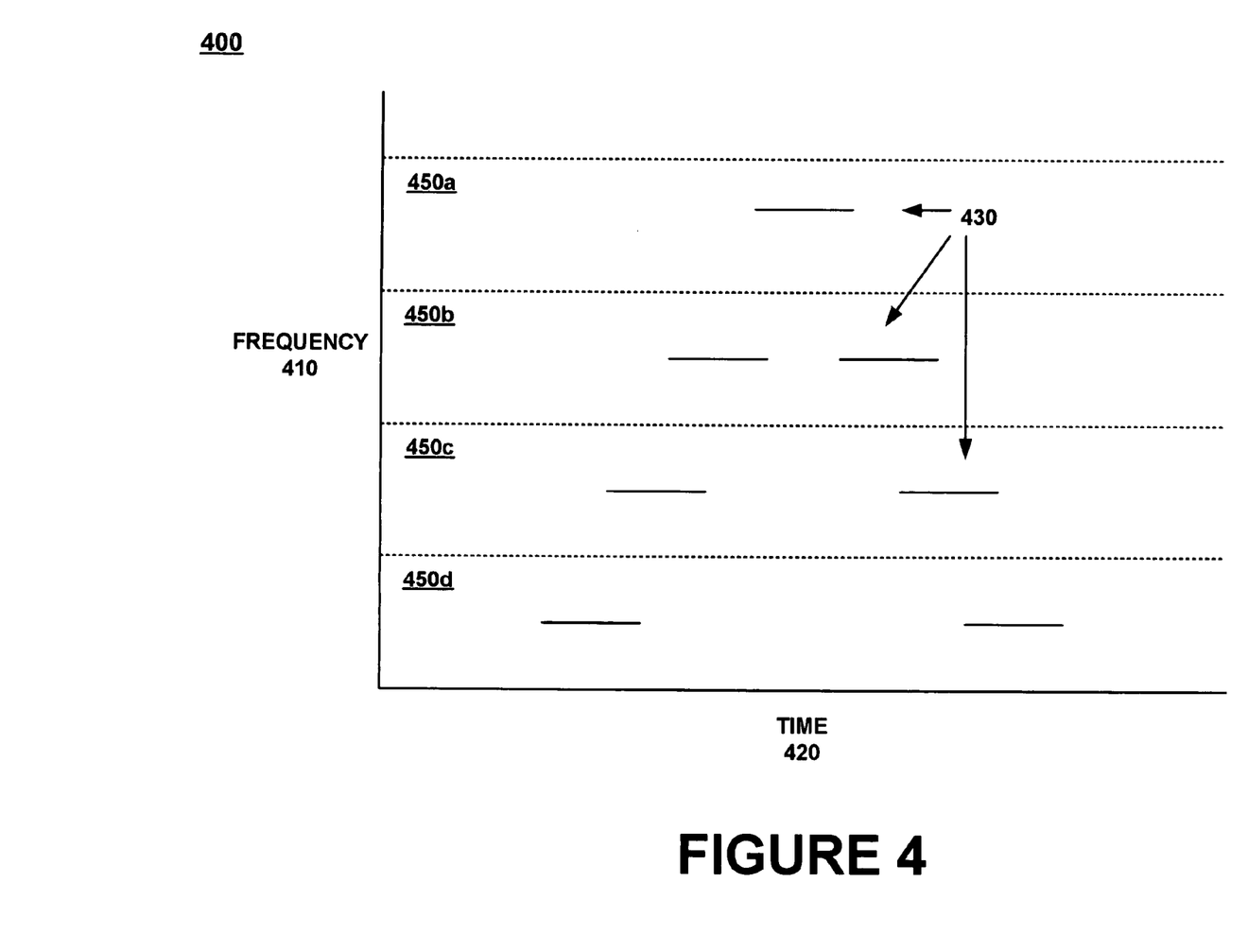
FIG. 4 is a graphical diagram of frequency versus time illustrating high frequency spread spectrum modulation in accordance with one embodiment of the present invention.

FIG. 4 is a graphical diagram 400 of frequency 410 versus time 420 illustrating high frequency spread spectrum modulation in accordance with one embodiment of the present invention. Diagram 400 comprises single cycles 430 at four discrete frequencies of a high frequency spread spectrum. The four discrete frequencies modulate between four separate FCC EMI bands 450a–d. In one embodiment, the FCC EMI bands are 120 kHz apart. By modulating the periodic signal off the clock generator between separate FCC EMI bands, the measured energy at any one band is reduced. It should be appreciated that embodiments of the present invention may be used to modulate between any number of discrete frequencies.

Figure 5:
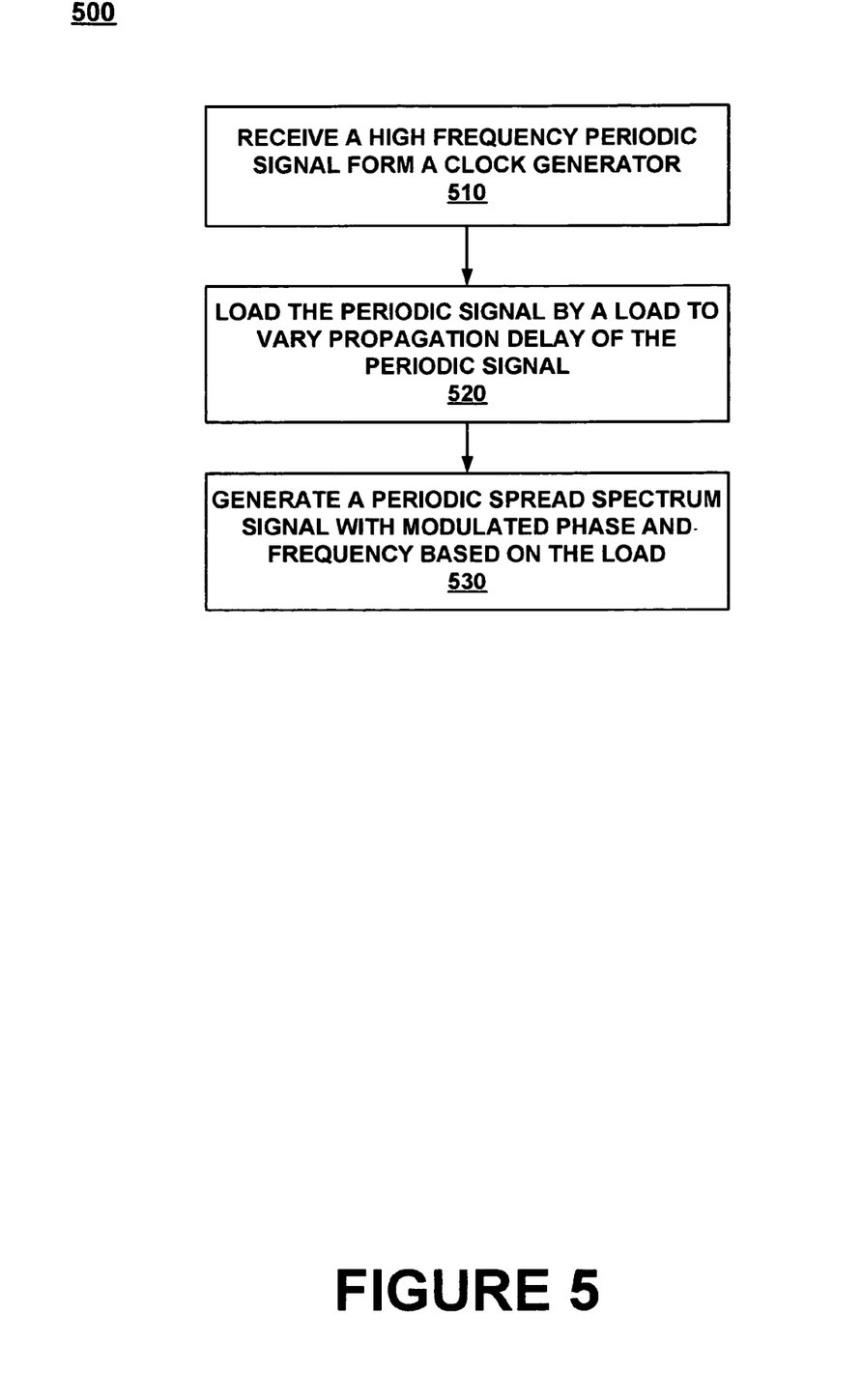
FIG. 5 is a flowchart diagram illustrating steps in a process for generating periodic spread spectrum signal using an analog spread spectrum signal generation circuit in accordance with one embodiment of the present invention.

FIG. 5 is a flowchart diagram illustrating steps in a process 500 for generating periodic spread spectrum signal using an analog spread spectrum signal generation circuit in accordance with one embodiment of the present invention. In one embodiment, process 500 is performed on an analog circuit. Although specific steps are disclosed in process 500, such steps are exemplary. That is, the embodiments of the present invention are well suited to performing various other steps or variations of the steps recited in FIG. 5.

At step 510, a high frequency periodic signal is received from a clock generator. In one embodiment, the high frequency periodic signal is the front-side bus frequency of the microcontroller. In one embodiment, the clock generator is a voltage controlled oscillator (VCO). In one embodiment, the VCO is locked to a reference frequency by a phase-locked loop. It should be appreciated that the clock generator may be any type of clock signal generator or oscillator circuit. For example, in another embodiment, the clock generator is a relaxation oscillator circuit. In another embodiment, the clock generator is a crystal oscillator circuit.

At step 520, the periodic signal is loaded by a load to vary propagation delay of the periodic signal. In one embodiment, the loading is performed by a plurality of switchable analog loading elements, each loading the periodic signal by a respective load to vary propagation delay of the periodic signal to an output node.

At step 530, a periodic spread spectrum signal with modulated phase is generated based on the loaded periodic signal. In one embodiment, the plurality of switchable analog loading elements are controlled by a decoder. In one embodiment, the decoder is driven by a counter, wherein the counter causes the output node to generate the periodic spread spectrum signal with modulated phase for reducing radiated electromagnetic interference and downstream phase-locked loop tracking error.

Various embodiments of the present invention are directed towards an analog circuit and a method for performing high frequency spread spectrum modulation. A modulated signal is set to a very high frequency to spread the signal energy over many bands to reduce any individual band's energy for FCC measurements. Due to the high modulation frequency, the modulated signal appears as cycle-to-cycle jitter to a downstream PLL, thereby reducing downstream PLL tracking error.

Various embodiments of the present invention, an analog spread spectrum signal generation circuit, are thus described. While the present invention has been described in particular embodiments, it should be appreciated that the present invention should not be construed as limited by such embodiments, but rather construed according to the below claims.

What is claimed is:

1. An analog spread spectrum signal generation circuit comprising:
   a clock generator for generating a periodic signal;
   a plurality of switchable analog loading elements each loading said periodic signal by a respective load to vary propagation delay of said periodic signal to an output node;
   a decoder for controlling said plurality of switchable analog loading elements; and
   a counter coupled to drive said decoder, wherein said counter causes said output node to generate a periodic spread spectrum signal with modulated phase.

2. The circuit as recited in claim 1 wherein said periodic spread spectrum signal with modulated phase is for reducing radiated electromagnetic interference and downstream phase-locked loop tracking error.

3. The circuit as recited in claim 1 wherein said periodic signal is a high frequency periodic signal.

4. The circuit as recited in claim 1 wherein said switchable analog loading elements are controlled to provide a non-uniform periodic distribution.

5. The circuit as recited in claim 1 wherein said switchable analog loading elements are controlled to provide a uniform periodic distribution.

6. The circuit as recited in claim 1 wherein said clock generator is a voltage controlled oscillator.

7. The circuit as recited in claim 1 wherein said switchable analog loading elements are capacitive load elements.

8. A microcontroller comprising:
   a bus;
   a processor coupled to said bus;
   a memory unit coupled to said bus;
   a plurality of input/output pins coupled to said bus; and
   an analog spread spectrum signal generation circuit coupled to said bus for generating a periodic spread spectrum signal with modulated phase, said periodic spread spectrum signal modulated at a high frequency such that said periodic spread spectrum signal appearing as cycle-to-cycle jitter to a downstream phase-locked loop (PLL).

9. The microcontroller as recited in claim 8 wherein said periodic spread spectrum signal with modulated phase is for reducing radiated electromagnetic interference and downstream phase-locked loop tracking error.

10. The microcontroller as recited in claim 8 wherein said analog spread spectrum signal generation circuit comprises:
    a clock generator for generating a said periodic signal;
    a plurality of switchable analog loading elements each loading said periodic signal by a respective load to vary propagation delay of said periodic signal to an output node;
    a decoder for controlling said plurality of switchable analog loading elements; and
    a counter coupled to drive said decoder, wherein said counter causes said output node to generate said periodic spread spectrum signal with modulated phase.

11. The microcontroller as recited in claim 10 wherein said periodic signal is a high frequency periodic signal.

12. The microcontroller as recited in claim 10 wherein said switchable analog loading elements are controlled to provide a non-uniform periodic distribution.

13. The microcontroller as recited in claim 10 wherein said switchable analog loading elements are controlled to provide a uniform periodic distribution.

14. The microcontroller as recited in claim 10 wherein said clock generator is a voltage controlled oscillator.

15. The microcontroller as recited in claim 10 wherein said switchable analog loading elements are capacitive load elements.

16. The microcontroller as recited in claim 10 further comprising an inverter for receiving said periodic signal and outputting said periodic signal over a signal line having said switchable loads coupled thereto.

17. In an analog spread spectrum signal generation circuit, a method for generating periodic spread spectrum signal, said method comprising:
    receiving a high frequency periodic signal from a clock generator;
    loading said periodic signal by a load to vary propagation delay of said periodic signal; and
    generating a periodic spread spectrum signal with modulated phase based on said load, said periodic spread spectrum signal modulated at a high frequency such that said periodic spread spectrum signal appearing as cycle-to-cycle jitter to a downstream phase-locked loop (PLL).

18. The method as recited in claim 17 wherein said loading is constant and drive strength of signal buffer is modulated by a plurality of switchable analog drive elements, each said switchable analog drive element reducing output impedance of said signal buffer to vary propagation delay of said periodic signal to an output node.

19. The method as recited in claim 17 wherein said loading is performed by a plurality of switchable analog loading elements, each loading said periodic signal by a respective load to vary propagation delay of said periodic signal to an output node.

20. The method as recited in claim 19 wherein said plurality of switchable analog loading elements are controlled by a decoder, wherein said decoder is driven by a counter, wherein said counter causes said output node to generate said periodic spread spectrum signal with modulated phase for reducing radiated electromagnetic interference and downstream phase-locked loop tracking error.

* * * * *